United States Patent
Cunningham et al.

(10) Patent No.: US 7,621,256 B2
(45) Date of Patent: Nov. 24, 2009

(54) SYSTEM AND METHOD FOR BOOSTED DIRECT INJECTION ENGINE

(75) Inventors: Ralph Wayne Cunningham, Milan, MI (US); Graham Hoare, Buphan (GB); Michael Howard Shelby, Dearborn Heights, MI (US); Gopichandra Surnilla, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 195 days.

(21) Appl. No.: 11/827,157

(22) Filed: Jul. 10, 2007

(65) Prior Publication Data

US 2007/0256666 A1 Nov. 8, 2007

Related U.S. Application Data

(63) Continuation of application No. 11/385,105, filed on Mar. 20, 2006, now Pat. No. 7,275,516.

(51) Int. Cl.
F02D 41/00 (2006.01)
(52) U.S. Cl. .................. 123/305; 123/295; 123/76; 701/105
(58) Field of Classification Search ......... 123/294–305, 123/76; 701/105
See application file for complete search history.

(56) References Cited

U.S. PATENT DOCUMENTS

| | | | | |
|---|---|---|---|---|
| 5,230,320 | A * | 7/1993 | Hitomi et al. | 123/559.1 |
| 6,748,919 | B2 * | 6/2004 | Abo et al. | 123/299 |
| 6,827,051 | B2 | 12/2004 | Kawasaki et al. | |
| 6,840,235 | B2 | 1/2005 | Koseki et al. | |
| 7,210,449 | B2 * | 5/2007 | Beer et al | 123/299 |
| 2005/0229909 | A1 | 10/2005 | Nakazawa et al. | |
| 2006/0278196 | A1 * | 12/2006 | Beer et al. | 123/299 |

FOREIGN PATENT DOCUMENTS

WO  WO 2004/051067  *  6/2004

* cited by examiner

*Primary Examiner*—Erick Solis
(74) *Attorney, Agent, or Firm*—Allan J. Lippa; Alleman Hall McCoy Russell & Tuttle LLP

(57) ABSTRACT

An engine system, comprising of a combustion chamber selectively communicating with an intake manifold via at least an intake valve and an exhaust manifold via at least an exhaust valve, a turbocharger including a compressor operatively coupled to the intake manifold and a turbine operatively coupled to the exhaust manifold, wherein the turbocharger is configured to selectively boost intake manifold pressure greater than exhaust manifold pressure during at least one operating condition, a direct fuel injector configured to inject fuel directly into the combustion chamber, a spark plug configured to provide an ignition spark to the combustion chamber, a valve actuation system coupled to the intake valve and the exhaust valve configured to vary a relative timing of the intake valve and the exhaust valve and a control system communicatively coupled to the valve actuation system, the direct fuel injector, and the spark plug wherein during said at least one operating condition, the control system is configured to operate the valve actuation system to increase an overlap between exhaust valve opening and intake valve opening to increase an amount of air flowing through the combustion chamber from the intake manifold via the opened intake valve to the exhaust manifold via the opened exhaust valve, initiate an injection of fuel directly into the combustion chamber via the direct fuel injector after the exhaust valve has closed, and ignite said injected fuel by operating the spark plug to provide an ignition spark.

20 Claims, 7 Drawing Sheets

SYSTEM AND METHOD FOR BOOSTED DIRECT INJECTION ENGINE

The present application is a continuation of U.S. Ser. No. 11/385,105, titled "System and Method for Boosted Direct Injection Engine", filed Mar. 20, 2006 now U.S. Pat No. 7,275,516, the entire contents of which are incorporated herein by reference.

BACKGROUND AND SUMMARY

Engines may use boosting devices, such as turbochargers, to increase engine power density. However, engine knock may occur due to increased combustion temperature, thus requiring spark retard, which in turn reduced fuel efficiency.

The inventors herein have recognized that under some conditions, utilizing intake manifold pressure boosting in which valve overlap near top dead center (TDC) is present may be advantageous in reducing residuals. Further, such valve timing and pressure boosting, in combination with direct injection fueling (e.g., in-cylinder injection) may be used to reduce charge temperatures and reduce the tendency for auto ignition (knock), thus enabling improved torque output and fuel economy under selected conditions.

However, the inventors have also recognized that under some conditions during valve overlap in which both intake and exhaust valves are concurrently at least partially open near TDC (such as near the end of the exhaust stroke, beginning of intake stroke) and intake manifold pressure is higher than exhaust pressure (due to boosting), fresh charge that does not participate in combustion may flow through to the exhaust manifold. Thus, by in some cases, it may be beneficial to utilize direct fuel injection that begins after exhaust valve closed (to reduce the likelihood of unburned fuel passing through to the exhaust) along with rich combustion so that an overall exhaust mixture may be maintained near stoichiometry. In this way, improved performance along with reduce emissions may be achieved.

DETAILED DESCRIPTION

Figure 1:
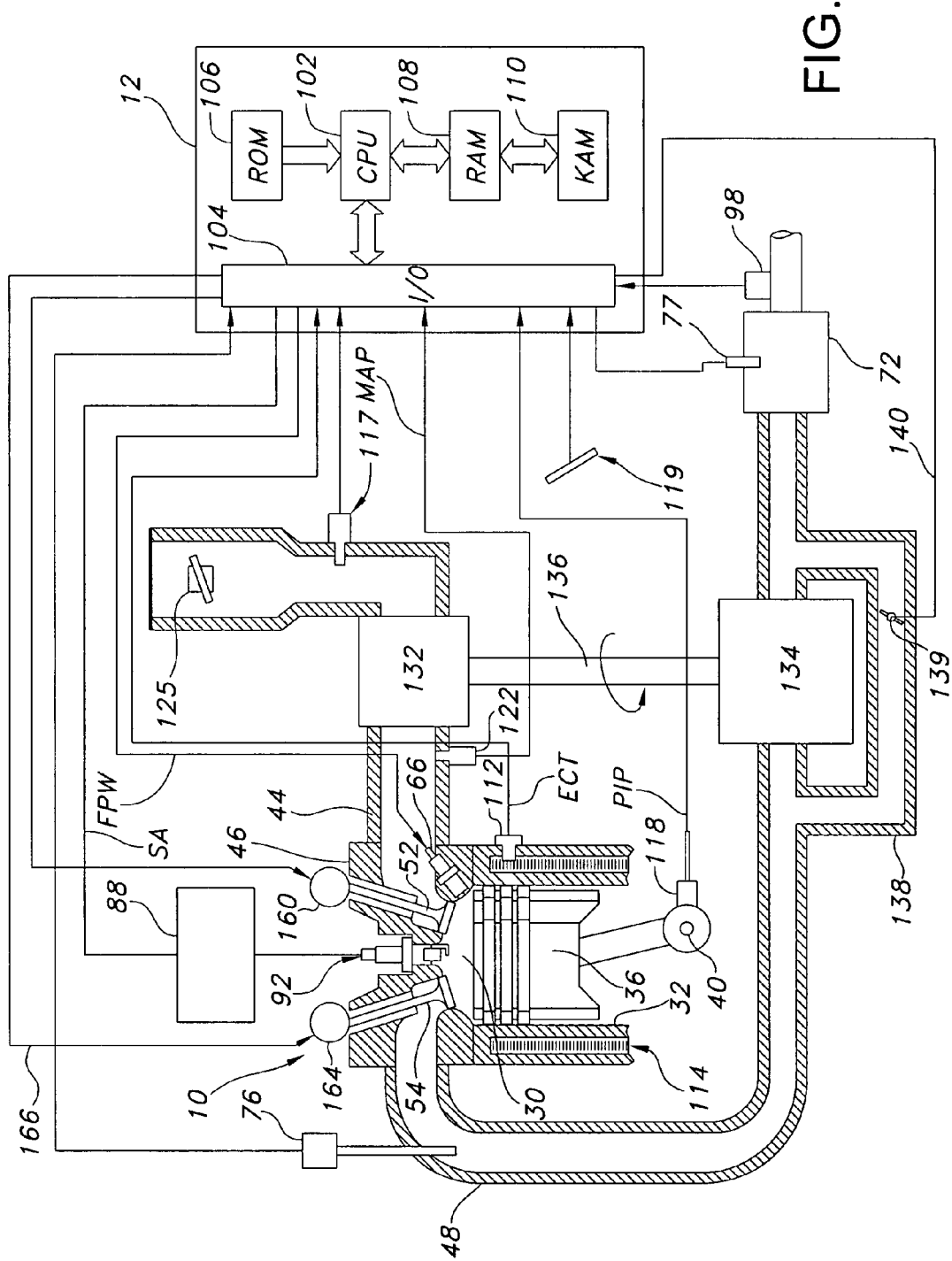
FIG. 1 is a schematic diagram of an engine.

Referring now to FIG. 1, internal combustion engine 10, comprising a plurality of cylinders, one cylinder of which is shown in FIG. 1, is controlled by electronic engine controller 12. Engine 10 includes cylinder head 46, combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. In this example, a single intake valve and exhaust valve are shown; however, there may be multiple intake valves and/or multiple exhaust valves. Each intake and exhaust valve may be operated by a camshaft, or both may be operated by a common camshaft. Variable valve timing operation may be used via a hydraulic actuator. In an alternative embodiment, the valves may be operated by an electromechanically controlled valve coil and armature assembly. In the example of FIG. 1, an intake cam 160 is shown for actuating valve 52, where the intake cam may have variable timing which is controlled via signal 162. Likewise, an exhaust cam 164 is shown for actuating valve 54, where the exhaust cam may have variable timing which is controlled via signal 166.

Cylinder 30 is also shown having direct fuel injector 66 coupled thereto for delivering liquid fuel in proportion to the pulse width of signal FPW from controller 12 via a fuel injection system (not shown), which may be a high pressure common gasoline fuel system. The fuel system may include a fuel tank, high and/or low pressure fuel pumps, and a fuel rail. The engine 10 of FIG. 1 is configured such that the fuel is injected directly into the engine cylinder, which is known to those skilled in the art as direct injection. In addition, intake manifold 44 is shown communicating with optional electronic throttle 125.

In the example of FIG. 1, cylinder head 46 is shown having fuel injector 66 coupled thereto in a side-injection position. However, the injector may also be positioned in an over-head position, such as adjacent spark plug 92, in an alternative embodiment. FIG. 1 also shows distributorless ignition system 88 providing ignition spark to combustion chamber 30 via spark plug 92 in response to controller 12.

Engine 10 is also shown coupled to a turbocharger system 130, which is one example compression device that may be used. Turbocharger system 130 includes a compressor 132 on the intake side and a turbine 134 on the exhaust side coupled via a shaft 136. In an alternative embodiment, a two-stage turbocharger may be used, if desired. In another alternative embodiment, a supercharger may be used having a compressor similar to 132 that is driven via the engine crankshaft 40.

Various types of turbochargers and arrangements may be used. For example, a variable geometry turbocharger (VGT) may be used where the geometry of the turbine and/or compressor may be varied during engine operation. Alternately, or in addition, a variable nozzle turbocharger (VNT) may be used when a variable area nozzle is placed upstream and/or downstream of the turbine in the exhaust line for varying the effective expansion of gasses through the turbine. Still other approaches may be used for varying expansion in the exhaust, such as a waste gate valve. FIG. 1 shows an example valve 139 acting as a waste gate in bypass passage 138 around turbine 134. Waste gate 139 receives a control signal 140 from controller 12. As noted above, the valve may be located within the turbine, or may be a variable nozzle. Also, a twin turbocharger arrangement, and/or a sequential turbocharger arrangement, may be used if desired Universal Exhaust Gas Oxygen (UEGO) sensor 76 is shown coupled to exhaust manifold 48 upstream of turbine 134 and emission control device 72. Device 72 may be a NOx catalyst, an SCR (selective catalytic reduction) catalyst, a particulate filter, or combinations thereof. A second exhaust gas oxygen sensor 98 is shown coupled to the exhaust system downstream of catalytic converter 72. Emission control device temperature is measured by temperature sensor 77, and/or estimated based on operating conditions such as engine speed, load, air temperature, engine temperature, and/or airflow, or combinations thereof.

Controller 12 is shown in FIG. 1 as a conventional microcomputer including: microprocessor unit 102, input/output ports 104, and read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 119 coupled to an accelerator pedal; a measurement of engine manifold pressure (MAP) from pressure sensor 122 coupled to intake manifold 44; a measurement (ACT) of engine air charge temperature or manifold temperature from temperature sensor 117; and an engine position sensor from a Hall effect sensor 118 sensing crankshaft 40 position. In a preferred aspect of the present description, engine position sensor 118 produces a predetermined number of pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variations or combinations thereof.

Engine 10 further has a pressurized air delivery system for delivering higher pressure air to the combustion chamber, an example of which is described in more detail below herein with regard to FIG. 4.

Continuing with FIG. 1, it shows catalytic converter 72, which can include multiple catalyst bricks, in one example. In another example, multiple emission control devices, each with multiple bricks, can be used. Converter 72 can be a three-way type catalyst in one example.

Engine 10 may be used for road vehicles, boats, earthmoving equipment, airplanes, generators, pumps, etc.

Figure 2:
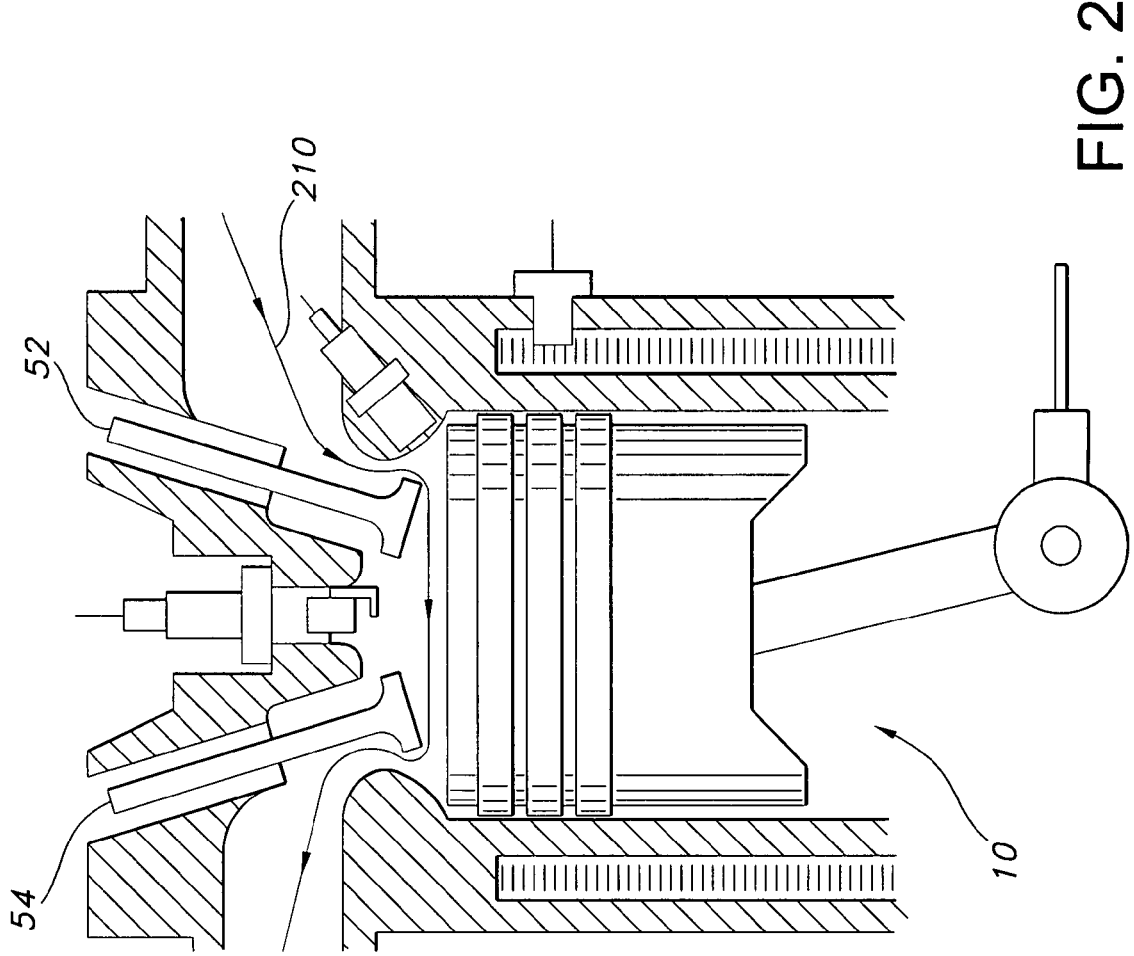
FIG. 2 is an enlarged view of the engine during a valve overlap condition.
Figure 3:
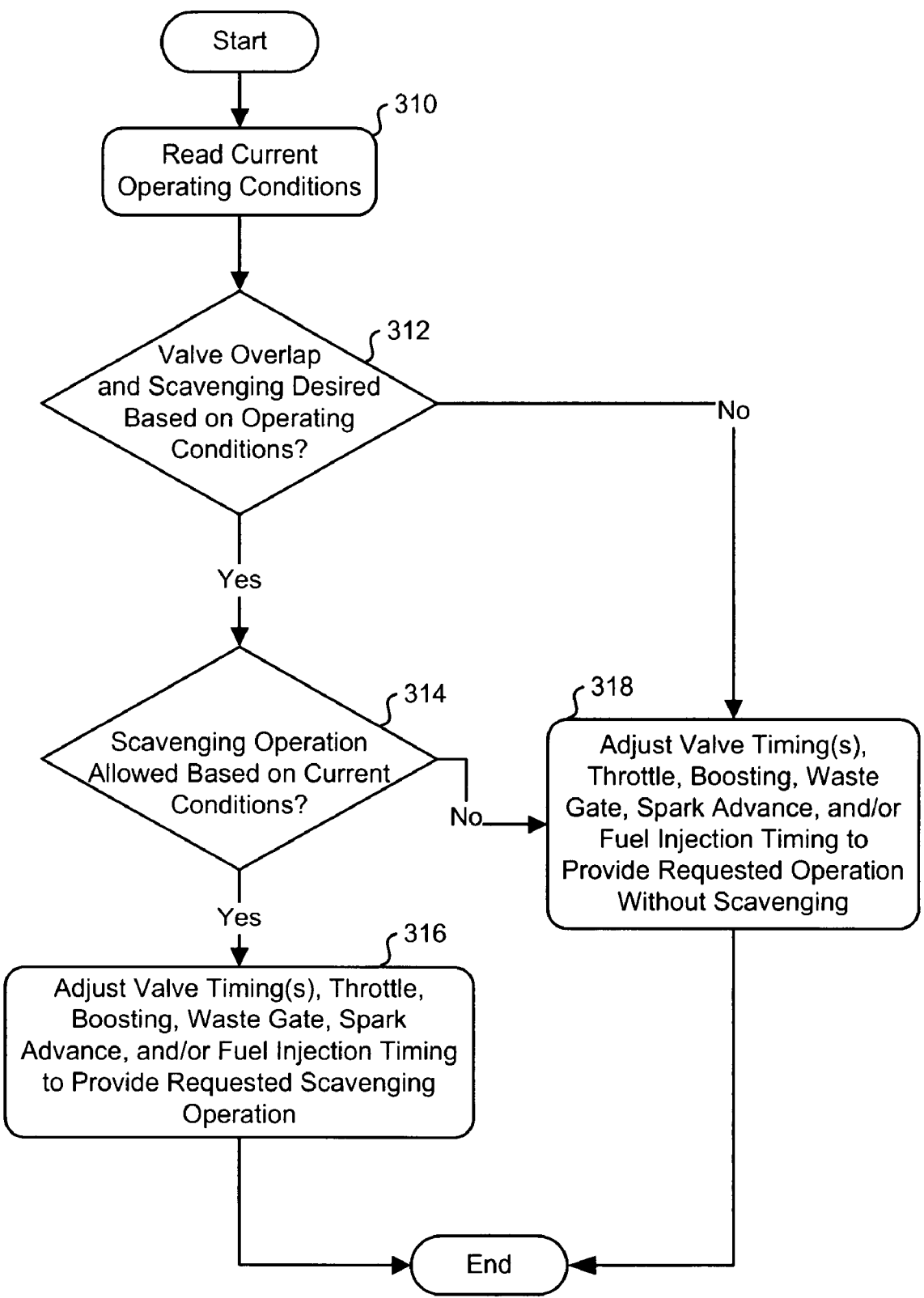
FIGS. 3-6 are high level flowcharts illustrating example control routines.

As described in more detail herein, engine 10 may be operated under a variety of modes, including a boosted condition in which valve overlap near top dead center (TDC) is present. Such operation reduces residual under a pressure charged condition. Specifically, variable valve timing, pressure boosting, and direct injection fueling (e.g., in-cylinder injection) after exhaust valve closing (EVC) may be used to reduce charge temperatures and reduce the tendency for auto ignition (knock), thus enabling improved torque output and fuel economy under selected conditions. However, under some conditions during the valve overlap in which both intake and exhaust valves are concurrently at least partially open near TDC (end of exhaust stroke, beginning of intake stroke) and intake manifold pressure is higher than exhaust pressure (due to boosting), fresh charge that does not participate in combustion may flow through to the exhaust manifold. Such a condition is illustrated by the flow path 210 in FIG. 2 which shows an enlarged view of the engine 10 from FIG. 1.

This process may result in a "loss" of fresh air charge to the exhaust system, which may be referred to as a scavenging effect. As described in more detail below, this air amount may be compensated for in various routines in controller 12, such as fueling, spark timing, boosting control, etc. Under some conditions during such operation where fresh charge passes through to the exhaust without being present in the cylinder during combustion, a rich air-fuel ratio during combustion is utilized so that the overall exhaust air-fuel ratio may be retained about stoichiometry. Alternatively, under other conditions, a stoichiometric combustion air-fuel ratio is utilized, and thus a lean overall exhaust air-fuel may be obtained. Further, under still other conditions, a lean combustion air-fuel ratio is utilized, and thus an even more lean overall exhaust air-fuel may be obtained. In one example where the combustion performed less rich than needed to obtain a stoichiometric exhaust mixture, a second post injection of fuel may be used to provide unburned fuel to react with excess oxygen to maintain exhaust mixture air-fuel ratio about stoichiometry.

In the above example where scavenging causes fresh charge to pass through to the exhaust along with rich combustion, the combustion air-fuel ratio may be controlled so that the overall exhaust air-fuel ratio is approximately stoichiometric, lean, or rich. As such, under some conditions, there may be an exothermic reaction in the exhaust which generates heat in the exhaust system. Such operation could be used to increase torque and speed of the turbocharger, for example. Further, the level of rich combustion may be adjusted via fuel injection and/or airflow so that as the combustion is enriched, the combustion air-fuel ratio is run up to approximately a first rich air-fuel ratio (e.g., about 0.93 lambda, or relative air-fuel ratio to stoichiometry, so as to get about 4% more torque with 7% extra fuel), with spark retard if necessary to further increase heat and/or reduce torque. Such operation may reduce feedgas NOx emissions. However, if the excess air is more than approximately 7%, the extra fuel can be injected in the exhaust for direct heat conversion during an exhaust stroke injection. The above approach may be used to reduce NOx generation of rich combustion, if desired.

Alternatively, or in addition, the above noted scavenging with rich combustion may be used to increase the heating of the catalyst, depending on the feedgas emission effect.

Also, when excess air and burned or unburned reductant is present in the exhaust without complete combustion, an exhaust air-fuel ratio sensor (e.g., 76), such as a UEGO sensor in the exhaust manifold, may read lean based on the diffusion rates of oxygen versus HC molecules. In other words, the UEGO sensor usually catalyzes oxygen and HC to give the overall air/fuel, but, the diffusion barrier of the sensor may cause differential amounts to be available at the sensor element. However, exhaust air-fuel ratio sensors mounted in or downstream of an emission control device (e.g., 98) may therefore provide more accurate information for control of air-fuel ratio via fuel injection under this condition.

The compensation for the lost air charge can take various forms. In one example, air measured by a mass airflow sensor (MAF) and/or manifold pressure sensor (MAP) may be adjusted (e.g., decreased) in determining an estimate of the combustion air-fuel ratio to remove the air that does not take part in combustion. Thus, when using a base calculation of airflow based on MAF, for example, the amount of lost air charge is subtracted from the base calculation. This adjusted air amount may then be used to schedule a desired fuel injection amount (when controlling combustion air-fuel ratio to a desired value, for example). Further, it may be used to estimate a corrected engine torque calculation, to control and/or monitor an electronically controlled throttle, and/or to adjust ignition timing. Further still, this information may be used to correct readings from exhaust gas oxygen sensors that measure a mixture of exhaust gasses of combustion and the lost air charge. Such effected exhaust gas readings may be adjusted for air-fuel ratio feedback control and/or feedback fuelling corrections. Alternatively, feedback from effected sensors may be disabled when lost air charge conditions are present. Further details of such operation is described in more detail later herein.

While the above operation (in which lost air occurs) may be encountered depending on various combinations of valve timing, intake pressure, exhaust pressure, etc., other operating modes may also be used. For example, under conditions of valve overlap where intake pressure is not substantially greater than exhaust pressure (or conditions without valve overlap, for example), the lost air amount issue is generally not present, and thus combustion and exhaust air-fuel ratio control may be performed utilizing conventional approaches based on a mass air-flow sensor reading, exhaust gas oxygen sensor reading, manifold pressure sensor reading, etc.

Referring now to FIGS. 3-6, example control routines are described for controlling system operation. Specifically referring now to FIG. 3, a routine is described for selecting an engine operating mode based on operating conditions. First, in 310, the routine reads current operating conditions, such as a driver request (e.g., requested wheel torque, requested engine torque, requested acceleration, pedal position, etc.), engine speed, engine load, throttle position, boosting level, valve timing, fuel injection amount and timing, engine temperature, vehicle speed, and/or combinations thereof. Next, in 312, the routine determines whether engine operation with valve overlap and the above noted scavenging effect (e.g., in which lost airflow may occur) is desired based on the operating conditions. For example, the routine may determine whether the requested engine output is within a specified speed and load region in which valve overlap with scavenging is desired. If so, the routine continues to determine whether the above noted scavenging effect is enabled based on operating conditions, such as exhaust temperature, time since engine start, others, or combinations thereof. If so, the routine continues to 316 to adjust valve timing of intake and/or exhaust valves to generate valve overlap near TDC (end of compression, beginning of intake), adjust boosting and/or intake manifold pressure (e.g., via the waste gate and/or throttle), adjust spark timing, adjust fuel injection amount, and adjust fuel injection timing, or combinations thereof, to provide the requested operation. Alternatively, when the answer to either 312 or 314 is no, the routine continues to 318 to adjust the above parameters to perform operation without the lost air scavenging effect.

Figure 7:
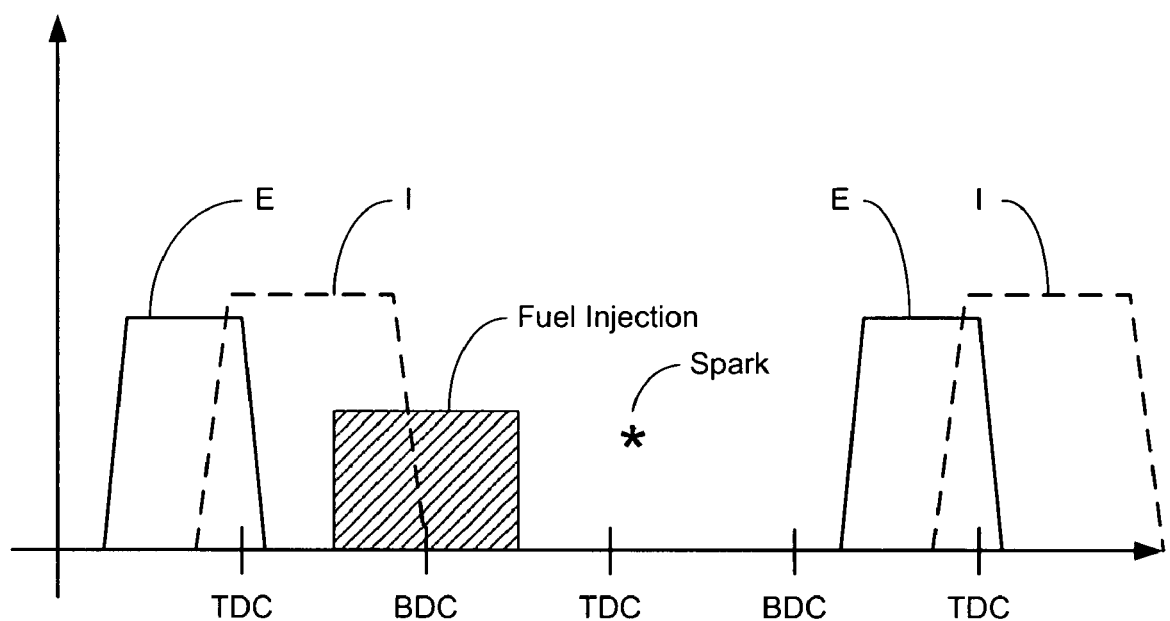
FIG. 7 is an example timing diagram of example operation.

In one example, in 316, under some conditions, the routine adjusts exhaust valve closing to occur after intake valve opening near top dead center of piston position, and further adjust direct fuel injection to begin after exhaust valve closing. Alternatively, under other conditions, the injection timing may occur before exhaust valve closing. In this way, when desired, it can be possible to reduce the amount of injected fuel that is carried through to the exhaust via the lost air charge, thereby reducing unburned hydrocarbons in the exhaust. In other words, a rich combustion exhaust mixture may be mixed with lost air (where the lost air doesn't carry unburned fuel) in the exhaust and reacted in a catalyst with improved efficiency. As such, the system can advantageously use direct injection rather than port injection, in this example. An example of such operation is shown in the graph of FIG. 7, discussed in more detail below herein.

Figure 4:
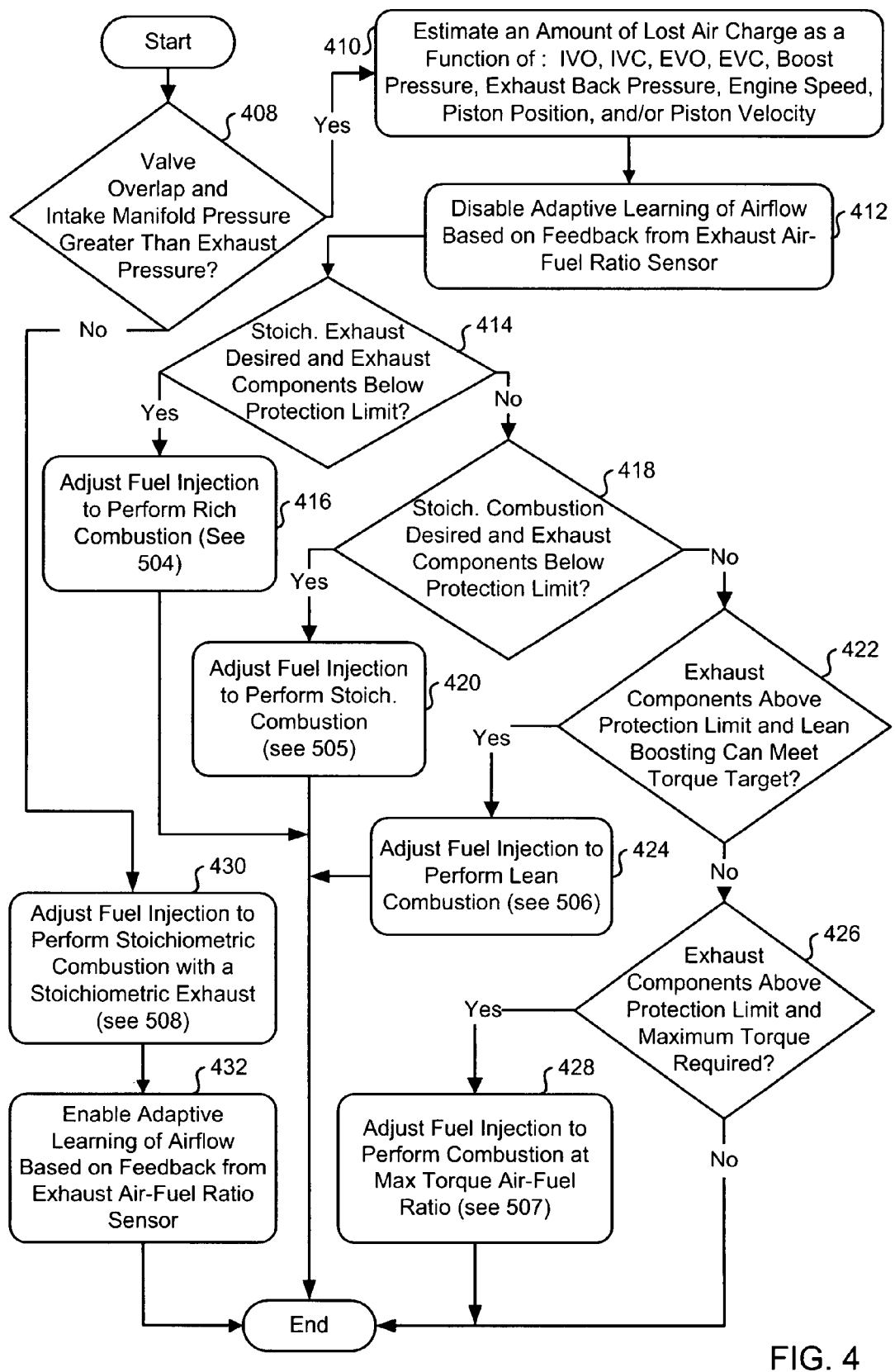

Referring now to FIG. 4, a routine is described for controlling combustion air-fuel ratio under various operating modes. First, in 408, the routine determines whether valve overlap and intake (boost) pressure is greater than exhaust pressure. In other words, the routine determines whether conditions may be present in which the lost air charge scavenging effect may be present. If so, the routine continues to 410. In 410 the routine estimates an amount of lost air charge as a function of: IVO timing, IVC timing, EVO timing, EVC timing, valve lift(s), boost pressure, exhaust back pressure, engine speed, piston position, and/or piston velocity. As noted below, fueling may be adjusted to compensate for the unused oxygen due to scavenging and the calculation of 410 may be an input to the fueling adjustment. Next, in 412, the routine disables adaptive learning of airflow based on feedback from switching exhaust gas sensors that may be affected by the lost air charge. In other words, if such sensors are used to adaptively learn degradation of a mass airflow sensor (or manifold pressure sensor), then such learned is disabled in 412.

Continuing with FIG. 4, in 414 the routine determines whether three-way catalysis (or whether exhaust air-fuel ratio is desired to oscillate about stoichiometry) and whether exhaust components (e.g., turbine, sensors, catalyst, valves, . . . ) are below protection limit temperatures. If so, the routine continues to 416 to adjust fuel injection to perform rich combustion so that an overall exhaust gas mixture is maintained about stoichiometry when taking into account the lost air from scavenging. Note that in this case, the fueling adjustment (whether open loop based on MAF and/or MAP or closed loop including feedback from an exhaust gas sensor that measures a mixture of the combustion gasses and lost air) may be determined without subtract the lost air charge from fueling calculation as described in 504 et seq. of FIG. 5.

Otherwise, when the answer to 414 is no, the routine continues to 418 to determine whether stoichiometric combustion is desired and exhaust component temperature (turbine, sensors, catalyst, valves, . . . ) are below protection limits. If so, the routine continues to 420 to adjust fuel injection to perform combustion at, or which oscillates about, stoichiometry. In this case, the lost air amount may be subtracted from a based air amount determined from throttle position, engine speed, MAP, MAF, combinations thereof, etc., as described in 505 et seq. of FIG. 5.

Otherwise, when the answer to 418 is no, the routine continues to 422 to determine whether exhaust component temperature (turbine, sensors, catalyst, valves, . . . ) are above protection limits and lean boosting operation can meet torque requirements. If so, the routine continues to 424 to adjust fuel injection to perform lean combustion. In this case, the lost air amount may be subtracted from a based air amount determined from throttle position, engine speed, MAP, MAF, combinations thereof, etc., as described in 506 et seq. of FIG. 5.

Otherwise, when the answer to 422 is no, the routine continues to 426 to determine whether exhaust component temperature (turbine, sensors, catalyst, valves, . . . ) are above protection limits and maximum engine torque is required. If so, the routine continues to 428 to adjust fuel injection to perform combustion at the air-fuel ratio which produced maximum engine torque. Alternatively, the routine may select the air-fuel ratio which provides the maximum torque while also reducing exhaust temperatures to acceptable levels. In this case, the lost air amount may be subtracted from a based air amount determined from throttle position, engine speed, MAP, MAF, combinations thereof, etc., as described in 507 et seq. of FIG. 5.

Otherwise, when the answer to 426 is no, the routine continues to the end. Further, when the answer to 408 is no, the routine continues to 430 to adjust fuel injection to perform combustion at, or oscillating about, stoichiometry, where the exhaust gas air-fuel ratio is substantially the same as the combustion air-fuel ratio due to a lack of lost air charge. In this case, fuelling calculation may be performed as described in 508 et seq. of FIG. 5. Further, in 432, the routine also enables adaptive learning that may have been disabled in 412.

Figure 5:
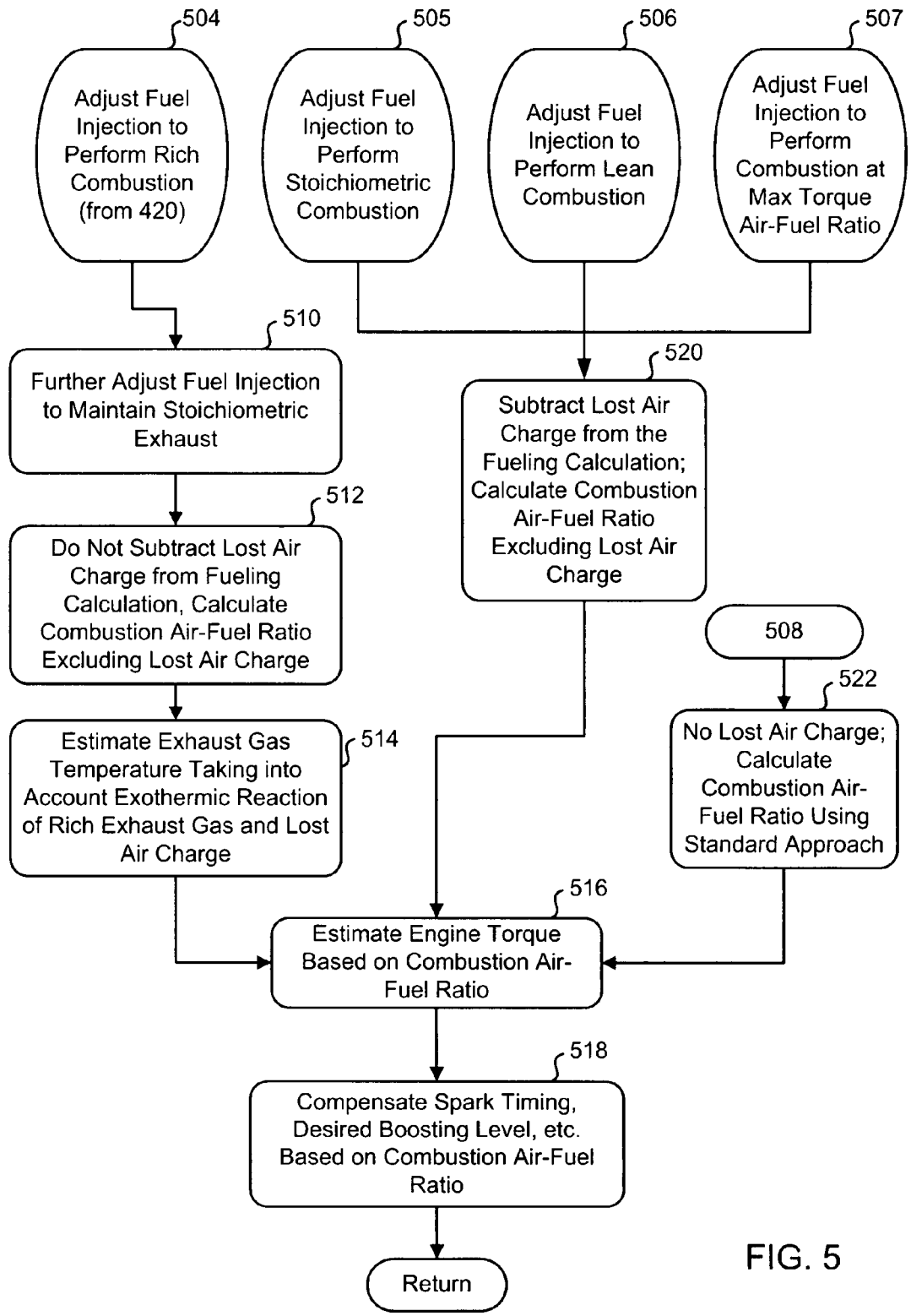

Referring now to FIG. 5, additional operations following from FIG. 4 are described. Specifically, from 416, the routine continues from 504 to 510 where fuel injection may be further adjusted to control combustion air-fuel ratio of an exhaust mixture (of rich combustion and lost air) about a desired air-fuel ratio, such as oscillating about stoichiometry. For example, if an exhaust gas sensor in the exhaust system (e.g., a HEGO) is present in a location downstream of a mixing volume (e.g., the exhaust manifold or an emission control device), the sensor output may be used to control the amount of fuel injection to maintain a mixture air-fuel ratio. Further, since the overall amount of air and fuel injection is controlled, the reading of the mass air-flow sensor may be used for open loop fueling without concern for subtracting the lost air amount (as the total fueling is governed based on the mixture air-fuel ratio). Thus, in 512, the routine does not subtract the lost air charge from the overall fueling calculation, determines the rich combustion air-fuel ratio based on the amount of lost air, and further calculates the excess exhaust oxygen content due to the lost air. Then, in 514, the routine estimates exhaust gas temperature taking into account any increased exothermic reaction caused by the rich exhaust gasses and excess oxygen.

Continuing with FIG. 5, in 516 the routine estimates engine output torque based on the combustion air-fuel ratio, and in 518 compensates the spark timing, desired boosting level, and other parameters based on the combustion air-fuel ratio.

Alternatively, from 420, the routine continues from 505 to 520 to subtract the lost air charge from the fueling calculation so that the fueling may be based on the amount of air that will participate in combustion in the combustion chamber and the desired air-fuel ratio (e.g., stoichiometry, lean, etc.). Further, the routine calculates combustion air-fuel ratio excluding the lost air charge as noted above. Again, feedback may be provided from exhaust air-fuel ratio sensors (e.g., 98 and/or 76), however, the reading would be adjusted again by excluding the shift caused by the amount of lost air if used to control combustion air-fuel ratio. Alternatively, feedback from an exhaust gas oxygen sensor may be used to further adjust any estimates of the lost air charge, such as if the sensor is a UEGO type sensor giving a reading over a wider air-fuel ratio. From 520, the routine continues to 516 discussed above herein. Further still, the sensor readings may be adjusted based on location to account for differences in the diffusion rates, noted above herein.

Further, from 424 the routine continues from 506 also to 520, and from 428 the routine continues from 507 again to 520. And, from 430 the routine continues from 508 to 522 in which there is no lost air charge and so the routine may calculate the combustion air-fuel ratio using the total fueling, air charge, and/or exhaust gas sensor readings directly, for example, without compensation for any lost air charge due to the noted scavenging effect.

Figure 6:
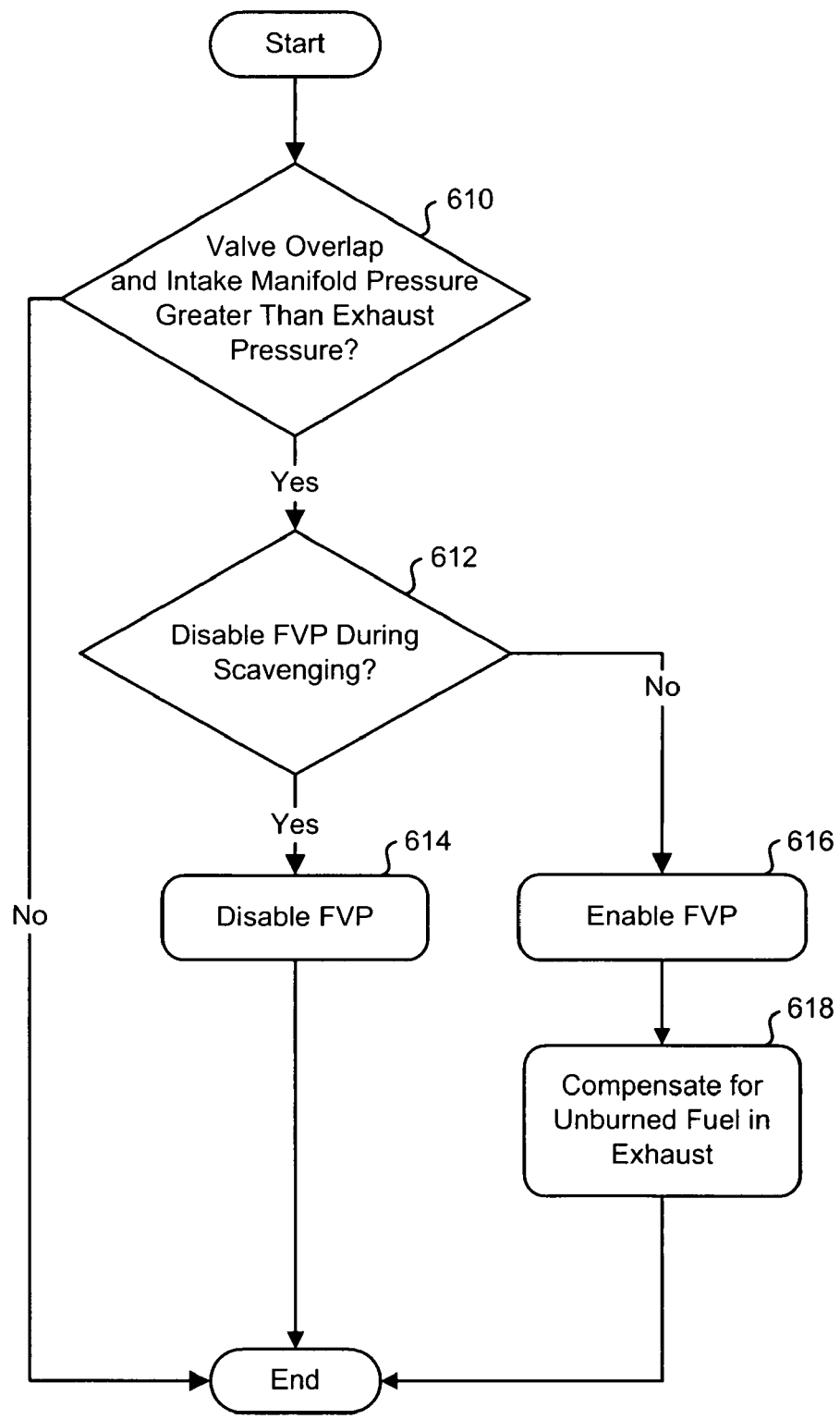

Referring now to FIG. 6, a routine is described for controlling fuel vapor purging operation taking into account engine operation. Specifically, in 610 the routine determines whether valve overlap and intake (boost) pressure is greater than exhaust pressure similar to 408. If so, the routine continues to 612 to determine whether fuel vapor purging should be disabled during such conditions. This determination may be based on several factors, such as exhaust temperature, a level of stored fuel vapors, etc. In other words, during increased exhaust temperatures, it may be desirable to reduce fuel vapor purging during scavenging conditions as unburned vapors may react in the exhaust to increase exhaust temperature greater than desired. Further, allowing unburned vapors to pass through to the exhaust may increase emissions. Alternatively, during conditions where a larger amount of fuel vapors need to be purged, it may be necessary to enable fuel vapor purging to avoid overfilling the vapor recovery system.

Continuing with FIG. 6, when the answer to 612 is yes, the routine continues to 614 to disable fuel vapor purging (e.g., close a fuel vapor purging valve coupled to the intake manifold). Alternatively, hen the answer to 612 is no, the routine continues to 616 to enable fuel vapor purging and then compensates for any unburned fuel vapors in the exhaust at 618. For example, the routine may decrease fuel injection and/or the combustion air-fuel ratio to maintain an exhaust air-fuel ratio about stoichiometry.

Referring now to FIG. 7, it shows an example timing diagram of a cycle of a cylinder, and specifically shows intake valve timing, exhaust valve timing, fuel injection timing, and spark timing for an example cycle. In the example shown, when intake manifold pressure is boosted greater than exhaust pressure, air may pass through to the exhaust during the overlap period, as noted above. Further, as shown in FIG. 7, by starting fuel injection after exhaust valve closing, the likelihood of fresh air passing though the cylinder during the overlap and carrying un-combusted fuel to the exhaust is reduced.

Note that the control routines included herein can be used with various engine configurations, such as those described above. The specific routine described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described acts may graphically represent code to be programmed into the computer readable storage medium in controller 12.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine system, comprising:
   a combustion chamber selectively communicating with an intake manifold via at least an intake valve and an exhaust manifold via at least an exhaust valve;
   a turbocharger including a compressor operatively coupled to the intake manifold and a turbine operatively coupled to the exhaust manifold, wherein the turbocharger is configured to selectively boost intake manifold pressure greater than exhaust manifold pressure during at least one operating condition;
   a direct fuel injector configured to inject fuel directly into the combustion chamber;
   a spark plug configured to provide an ignition spark to the combustion chamber;
   a valve actuation system coupled to the intake valve and the exhaust valve configured to vary a relative timing of the intake valve and the exhaust valve; and
   a control system communicatively coupled to the valve actuation system, the direct fuel injector, and the spark plug;
   where during said at least one operating condition, the control system is configured to: operate the valve actuation system to increase an overlap between exhaust valve opening and intake valve opening to increase an amount of air flowing through the combustion chamber from the intake manifold via the opened intake valve to the exhaust manifold via the opened exhaust valve, initiate an injection of fuel directly into the combustion chamber via the direct fuel injector after the exhaust valve has closed, the injection forming a mixture in the combustion chamber having a first air-fuel ratio during a first, lower, exhaust temperature operating condition, and a second air-fuel ratio during a second, higher, exhaust temperature operating condition, the second air-fuel ratio being less rich than the first air-fuel ratio, and ignite said injected fuel by operating the spark plug to provide an ignition spark.

2. The system of claim 1, wherein an amount of said directly injected fuel is greater than a stoichiometric ratio to an amount of air within the combustion chamber when the fuel is ignited during the first, lower, exhaust temperature operating condition.

3. The system of claim 1, wherein the valve actuation system is a single variable cam actuation system, and wherein the second air-fuel ratio is a lean air-fuel ratio.

4. The system of claim 1, wherein the valve actuation system is a dual variable cam actuation system.

5. The system of claim 4, wherein the dual variable cam actuation system includes at least a first variable cam coupled to the intake valve and a second variable cam coupled to the exhaust valve.

6. The system of claim 1 further comprising, a piston arranged within the combustion chamber, wherein the overlap between exhaust valve opening and intake valve opening is around top dead center of the piston.

7. The system of claim 6, wherein the exhaust valve is closed after top dead center of the piston and the intake valve is opened before top dead center of the piston.

8. The system of claim 1, wherein the valve actuation system is an electromagnetic valve actuation system.

9. The system of claim 1, further comprising at least second, third, and fourth combustion chambers selectively communicating with the intake and exhaust manifolds via intake and exhaust valves.

10. The system of claim 1, wherein the operating condition includes a condition where a speed of the turbocharger is increasing.

11. The system of claim 1, wherein the amount of air flowing through the combustion chamber from the intake manifold to the exhaust manifold is controlled by the control system to scavenge exhaust gases from the combustion chamber that were produced from a previous cycle of the combustion chamber.

12. The system of claim 1, further comprising a second intake valve arranged between the intake manifold and the combustion chamber, and a second exhaust valve arranged between the combustion chamber and the exhaust manifold.

13. A method of operating an engine system including at least a combustion chamber, an intake manifold selectively communicating with the combustion chamber via at least an intake valve, an exhaust manifold selectively communicating with the combustion chamber via at least an exhaust valve, and a turbocharger including a compressor operatively coupled to the intake manifold, the method comprising:
simultaneously holding the intake valve and the exhaust valve at an opened position while operating the compressor to boost intake manifold pressure relative to exhaust manifold pressure;
after simultaneously holding the intake valve and the exhaust valve at said opened position, closing the intake valve and the exhaust valve;
after closing the exhaust valve, injecting fuel directly into the combustion chamber in only a single injection during an engine cycle, the single injection forming a mixture in the combustion chamber having a first air-fuel ratio during a first, lower, exhaust temperature operating condition, and a second air-fuel ratio during a second, higher, exhaust temperature operating condition, the second air-fuel ratio being less rich than the first air-fuel ratio; and
providing an ignition spark to the combustion chamber to combust said injected fuel.

14. The method of claim 13, wherein the intake valve and the exhaust valve are simultaneously held open when a piston within the combustion chamber is at top dead center, and wherein the exhaust valve is closed after top dead center.

15. The method of claim 13, wherein an amount of the injected fuel is greater than a stoichiometric amount relative to an amount of air within the combustion chamber when the ignition spark is provided to the combustion chamber.

16. The method of claim 13, wherein the turbocharger further includes a turbine operatively coupled to the exhaust manifold and the compressor, and wherein the turbine is configured to transfer energy from exhaust gases received from the exhaust manifold to rotational energy at the compressor, and wherein the intake valve is opened and closed by a first variable cam of a variable cam actuation system and wherein the exhaust valve is opened and closed by a second variable cam of the variable cam actuation system.

17. A method of operating an engine including a turbocharger operatively coupled between an intake manifold and an exhaust manifold of the engine, wherein the engine includes at least a combustion chamber selectively communicating with the intake manifold via an intake valve and the exhaust manifold via an exhaust valve, the method comprising:
during a first condition, operating the turbocharger at a first speed;
during a second condition, operating the turbocharger at a second speed greater than the first speed;
transitioning the turbocharger between the first speed and the second speed by, during each of a plurality of cycles of the combustion chamber:
opening an exhaust valve of the combustion chamber;
while said exhaust valve is opened, opening an intake valve of the combustion chamber to enable air to flow from the intake manifold through the combustion chamber via the intake valve to the exhaust manifold via the exhaust valve;
after opening said exhaust valve and said intake valve, closing the exhaust valve and the intake valve;
after closing at least the exhaust valve, injecting fuel directly into the combustion chamber via a direct fuel injector in only a single injection during an engine cycle, the single injection forming a mixture in the combustion chamber;
selecting a first air-fuel ratio for the mixture during a first, lower, exhaust temperature operating condition;
selecting a second air-fuel ratio for the mixture during a second, higher, exhaust temperature operating condition, the second air-fuel ratio being less rich than the first air-fuel ratio; and
combusting at least a portion of said injected fuel by initiating an ignition spark within the combustion chamber via a spark plug.

18. The method of claim 17, wherein said air flowing from the intake manifold through the combustion chamber to the exhaust manifold scavenges exhaust gases from the combustion chamber that were produced by a previous combustion event.

19. The method of claim 17, wherein the first condition includes a lower engine torque output than the second condition and wherein the combustion chamber includes a piston and wherein the exhaust valve is closed after top dead center of the piston and the intake valve is opened before top dead center of the piston.

20. The method of claim 17, further comprising varying an overlap between the opening of the intake valve and the closing of the exhaust valve in response to a difference between the first speed and the second speed of the turbocharger and wherein the turbocharger speed includes a rotational speed of a shaft coupling a compressor of the turbocharger to a turbine of the turbocharger, wherein the compressor is operatively coupled to the intake manifold and the turbine is operatively coupled to the exhaust manifold.

* * * * *